UNITED STATES PATENT OFFICE.

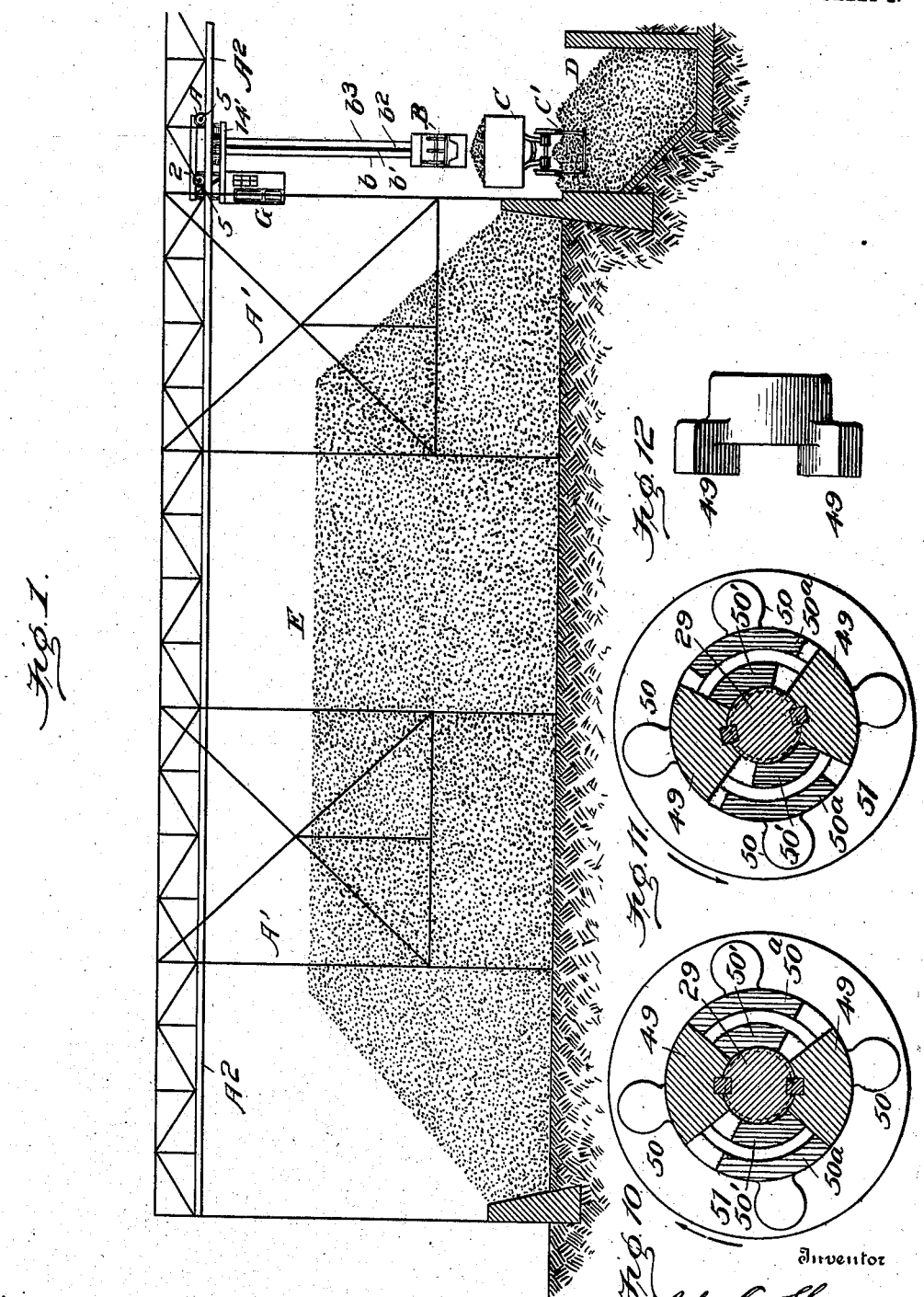

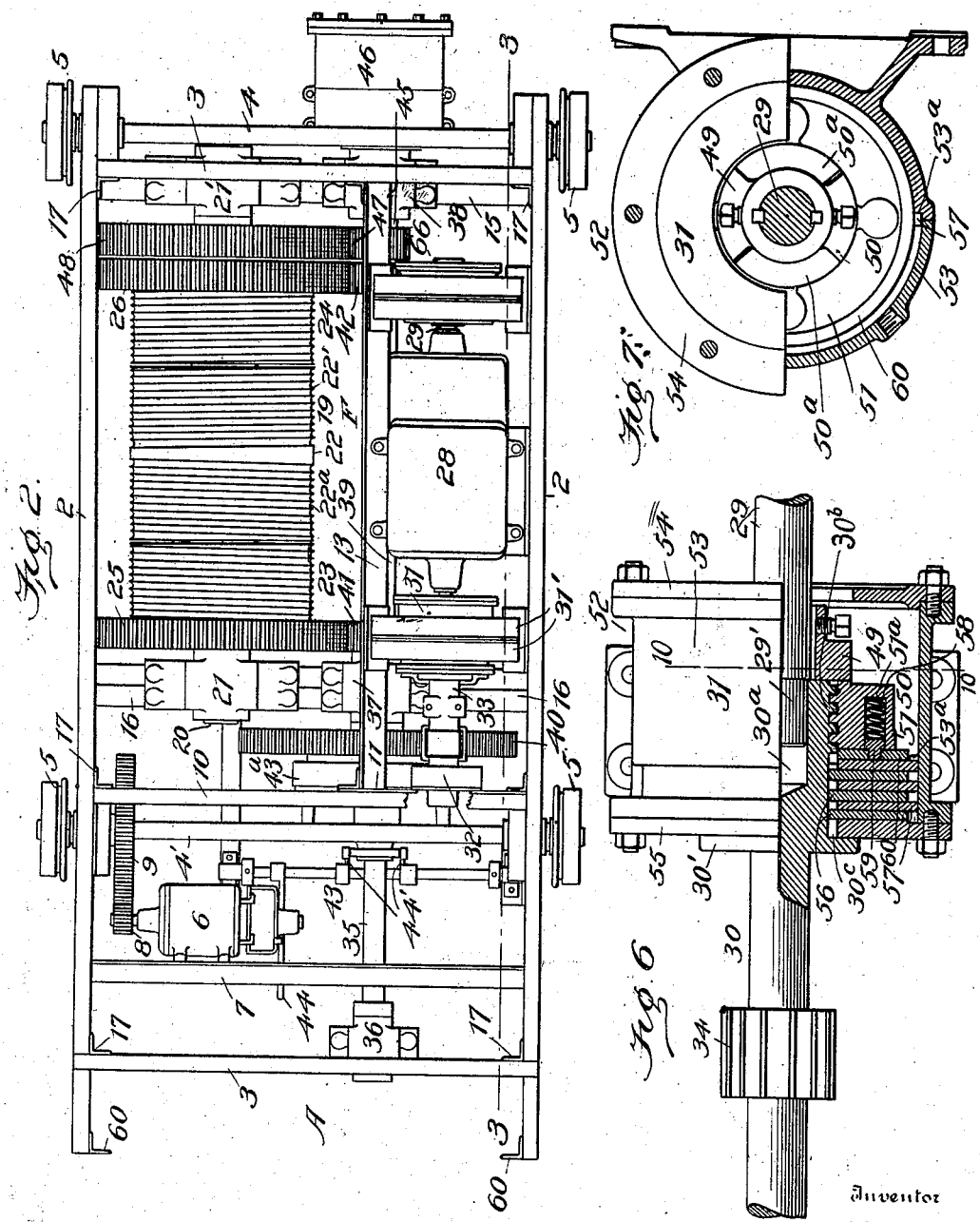

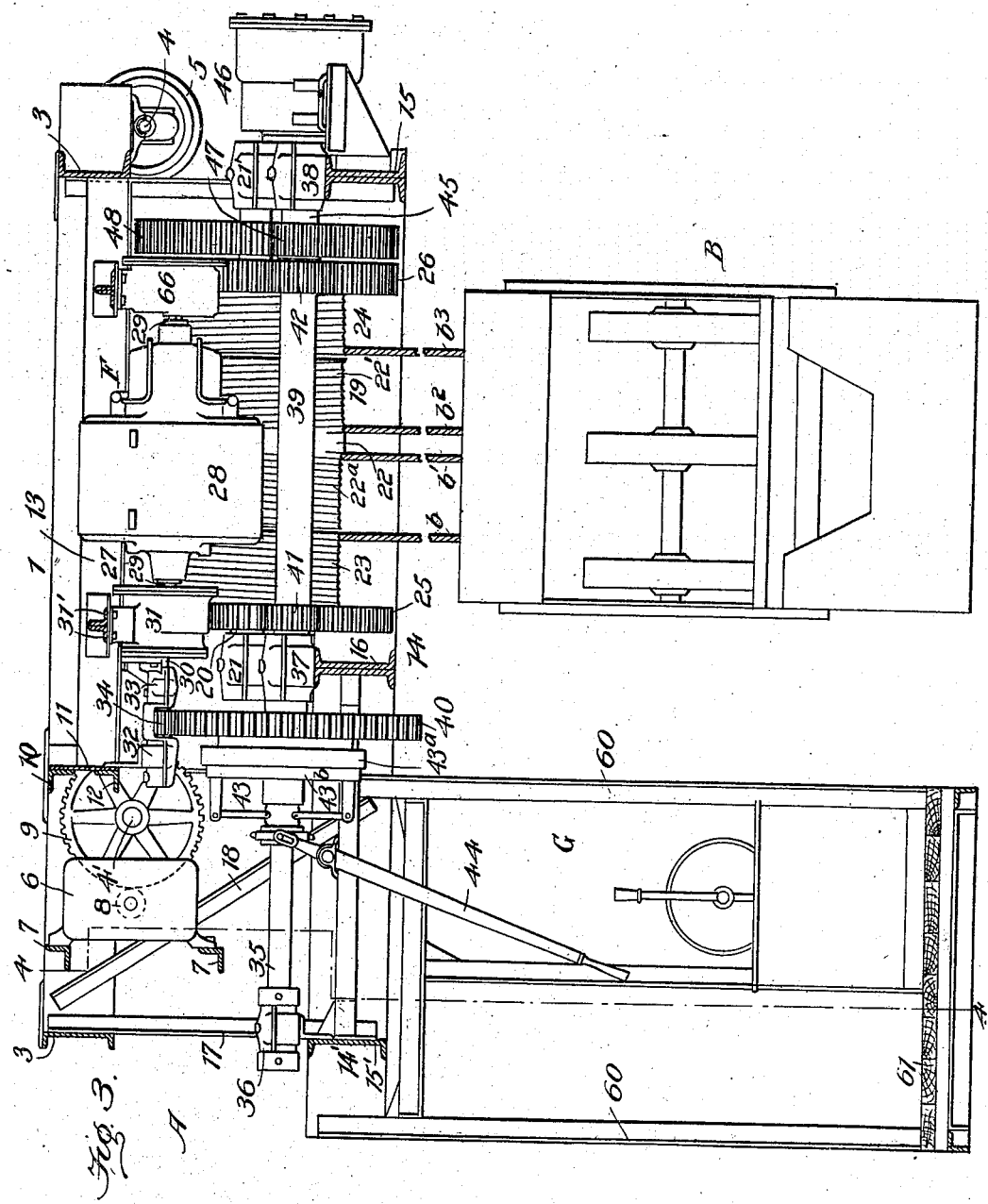

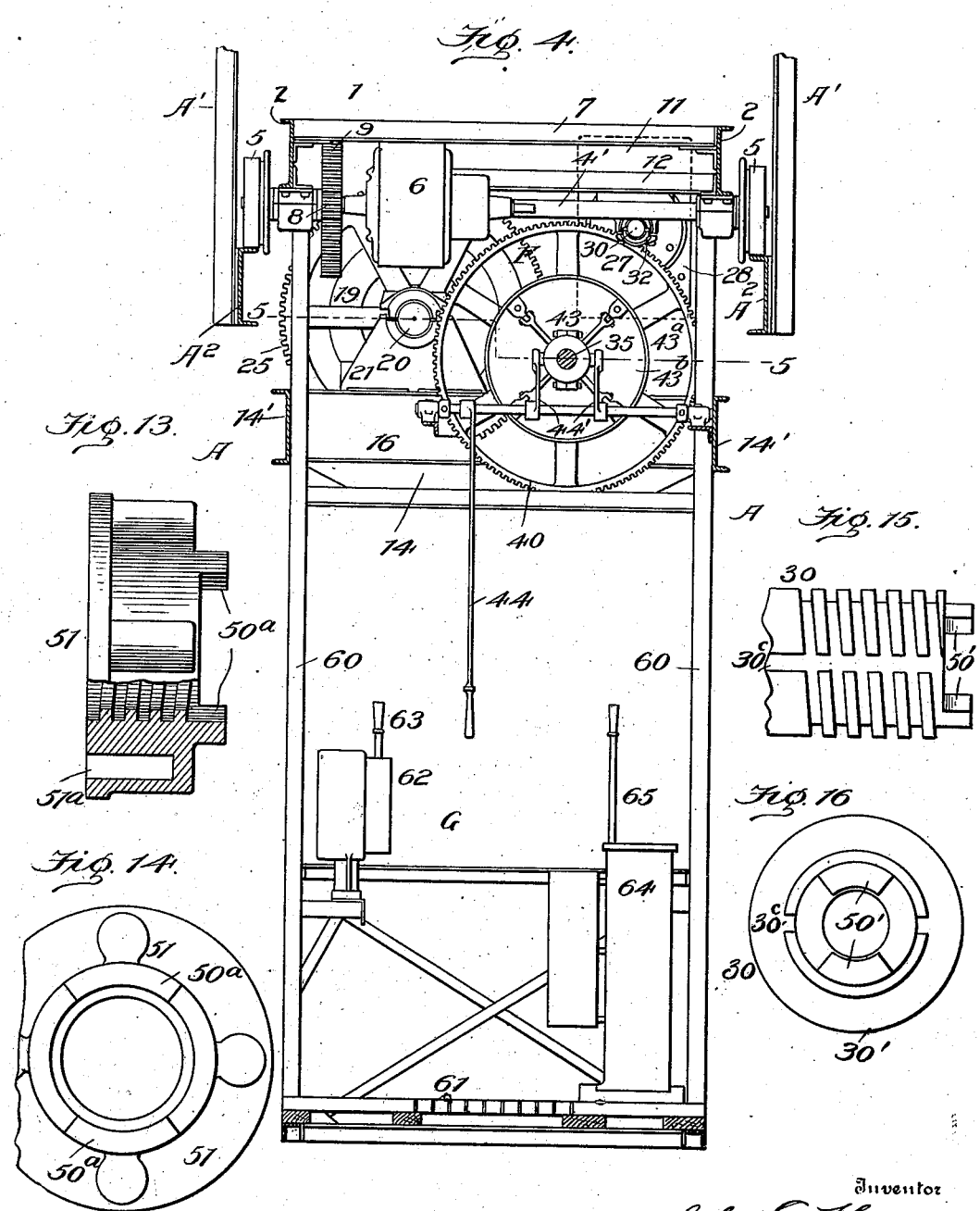

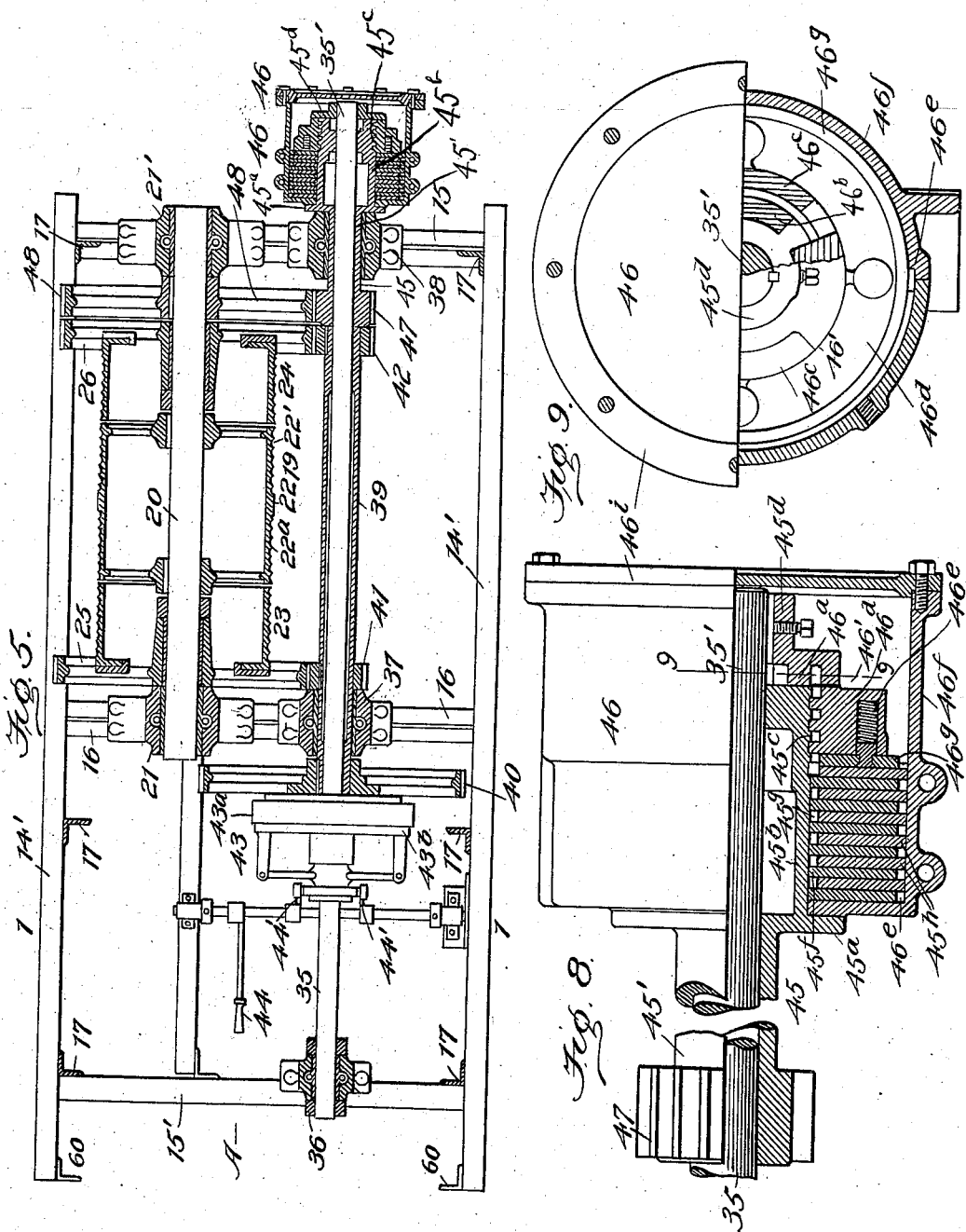

JOHN C. SLOCUM, OF COLUMBUS, OHIO, ASSIGNOR, BY MESNE ASSIGNMENTS, TO THE JEFFREY MANUFACTURING COMPANY, A CORPORATION OF OHIO.

LOADING AND UNLOADING MECHANISM.

No. 893,027.            Specification of Letters Patent.            Patented July 14, 1908.

Application filed July 22, 1904. Serial No. 217,716.

*To all whom it may concern:*

Be it known that I, JOHN C. SLOCUM, a citizen of the United States, residing at Columbus, in the county of Franklin and State of Ohio, have invented certain new and useful Improvements in Loading and Unloading Mechanism, of which the following is a specification, reference being had therein to the accompanying drawings.

This invention relates to improvements in hoisting and conveying apparatus, it being particularly adapted for use in operating clam shell or grab buckets for loading or unloading materials of various kinds.

Figure 1 is a side elevation of a storage and distributing plant provided with hoisting and conveying apparatus embodying my improvements. Fig. 2 is a plan view of a hoisting and conveying apparatus embodying my improvements. Fig. 3 is a section on the line 3—3, Fig. 2. Fig. 4 is a section on the line 4—4, Fig. 3. Fig. 5 is a section on the line 5—5, Fig. 4. Fig. 6 is a view partly in side elevation and partly in section, of a mechanical brake for the motor shaft. Fig. 7 is a view partly in end elevation and partly in section, of the same. Fig. 8 is a view partly in side elevation and partly in section, of a mechanical brake for the hold-drum shaft. Fig. 9 is a view partly in end elevation and partly in section, of the same a portion being broken away to indicate a sectional view along the line 9—9 of Fig. 8. Fig. 10 is a section on the line 10, 10 Fig. 6 showing the clutch elements in one position. Fig. 11 is a section on the line 10—10 Fig. 8 showing the clutch elements in positions they assume when the brake is set to prevent the rotation of the shafts controlled by it. Fig. 12 is a side elevation of one of the clutch elements. Fig. 13 is a view partly in elevation and partly in section of the follower for the friction brake. Fig. 14 is an end view of the same. Fig. 15 is a side elevation of the clutch end of the driven shaft. Fig. 16 is an end view of the same.

In the drawings A represents as an entirety a trolley carriage provided with a hoisting mechanism and a driving mechanism embodying my improvements, A' the framework which supports the trackway A² upon which the said trolley carriage A is adapted to move back and forth, and B represents a clam shell or grab bucket of any well known type, having the operating ropes or cables $b$, $b^1$, $b^2$, $b^3$, which are controlled by mechanism arranged upon the trolley carriage A and to be hereinafter described.

C represents a railway car adapted to travel on a track C' which is arranged above a pit D, this pit being sufficiently wide so that the bucket B can enter it on one side of the track C'.

E represents a pile of material which has been piled by the hoisting and conveying mechanism A, B.

It will be noted that the general arrangement of the mechanism is such that the hoisting and conveying apparatus can be used either to unload material from the car C or the pit D and deliver it to the pile E, or it may be used to deliver material from the pile E to the car C.

The foregoing illustration of a hoisting and conveying mechanism embodying my improvements indicates but one of the many uses to which my invention may be applied.

The carriage A has a frame 1 having the longitudinal side bars 2, 2, the end bars 3, 3, the front and rear axles 4 and 4' respectively, and the track wheels 5 mounted on said axles and adapted to support the frame.

In order to propel the carriage I provide a motor 6 arranged with its armature shaft parallel with and adjacent to the rear axle 4' and supported rigidly in place upon the frame by means of cross bars 7 mounted one above the other and secured at their ends to the side bars of the carriage.

8 is a pinion on the armature shaft adapted to mesh with a gear wheel 9 rigidly secured to the axle 4', so that when power is applied to drive the motor it will be transmitted directly to the gear 9 and the carriage will be propelled in one direction or the other according to the direction of rotation of the armature shaft. From this carriage is suspended the mechanism for operating the clam shell bucket B and also the cab for the operator. The former is indicated as an entirety by F while the latter is indicated as an entirety by G.

10 is a cross bar secured at its ends to the side bars 2, 2, of the carriage frame.

11 is a cross bar secured to one side of the bar 10 and extends downwardly and is secured at its lower edge to the cross bar 12 which is arranged parallel to the bar 10 and is similarly secured in position.

13 is a longitudinally arranged bar secured at its front end to the front end bar 3 of the carriage and its rear end to the cross bar or plate 11. Arranged beneath the carriage frame 1 and supported thereby is the drum frame 14 having the side bars 14', 14', parallel to and arranged directly beneath the side bars 2 of the carriage and having the end bars 15, 15'.

16 is a cross bar for the drum-supporting frame, secured at either end to the side bars 14', 14'.

17 are perpendicular bars connecting the carriage frame with the drum frame and 18 are brace bars serving the same purpose and also to supply the necessary rigidity of the said frames with reference to each other.

19 represents as an entirety the drum mechanism for controlling the winding and unwinding of the ropes of the clam shell bucket. This mechanism comprises a shaft 20 mounted in bearings 21, 21', rigidly secured upon the cross bar 16 and end bar 15 of the drum supporting framework respectively.

22 is a centrally arranged drum rigidly secured to the shaft 20. Preferably the periphery of this drum has right and left spiral grooves 22', 22$^a$, respectively, adapted to receive and guide the two ropes $b'$, $b^2$ in their winding and unwinding upon the drum.

23, 24, represent drums loosely mounted upon the shaft 20 at either end of the drum 22. These drums are likewise helically grooved in opposite directions to guide the ropes $b$, $b^3$, in winding and unwinding thereon.

25, 26 are gear wheels rigidly secured to the drums 23 and 24 respectively.

27 indicates as an entirety the power mechanism for operating the drums 22, 23 and 24. This power mechanism is suspended from the carriage frame 1.

28 is a motor rigidly secured to the longitudinal bar 13 and the side bar 2 on the same side of the carriage. 29 indicates the armature shaft of the said motor.

30 indicates a shaft having its axis arranged in alinement with the axis of the armature shaft 29. 31 is a mechanical brake interposed between the said armature shaft and the shaft 30. It is supported in place by the cross bars 31', 31', to which it is secured, the said cross bars having their opposite ends secured to the bar 13 and one of the bars 2 of the frame, respectively. The description of the operation of the mechanical brake will be hereinafter made.

32, 33, indicate bearings for the shaft 30 which are secured to the cross plate 11 and to the adjacent end plate of the mechanical brake housing. 34 is a pinion rigidly secured to the shaft 30 between the said bearings.

35 is a counter shaft arranged parallel to the drum shaft 20 and the armature shaft 29. This shaft is mounted at its rear end in a bearing 36 secured to the cross bar 15'; near its center in a bearing 37 secured to the cross bars 16, and near its outer end in a bearing 38 secured to the cross bars 15. The shaft projects some little distance beyond the bar 15 as indicated at 35'.

39 is a tubular shaft or sleeve mounted upon the shaft 35. 40 is a gear wheel rigidly secured to the said sleeve and arranged to mesh with the pinion 34 upon the shaft 30.

41, 42, are gears rigidly secured to the sleeve 39 and adapted to mesh respectively with the gears 25, 26, carried by the drums 23 and 24, respectively.

It will be seen that when power is applied from the motor through the mechanical brake 31 to the pinion 34 that it will be transmitted through the train of gears in such manner as to cause the rotation of the drums 23 and 24. In order to cause the rotation of the drum 22 I interpose between the gear 40 and the shaft 35 a friction clutch indicated as an entirety by 43. The stationary element 43$^a$ of this clutch is rigidly secured to the gear 40.

43$^b$ indicates the movable element of the clutch. A friction clutch of any well known style may be employed.

44 indicates the operating handle and 44' the connecting bars between the said handle and the movable element 43$^b$ of the clutch and adapted to permit the manual control of the said clutch element.

45 is a sleeve mounted in bearing 38 and loosely fitted upon the shaft 35, and 46 a mechanical brake interposed between the said sleeve and shaft, a detailed description of which will be hereinafter made.

47 is a gear rigidly secured to the sleeve 45 and adapted to mesh with a gear 48 rigidly secured to the drum shaft 20.

In Fig. 6 I have shown the mechanical brake which is interposed between the armature shaft 29 and the shaft 30. The shaft 30 has a collar or flange 30' preferably formed integrally therewith and the hollow end 30$^a$ into which the reduced end 29' of the armature shaft 29 is fitted so as to revolve freely. 49 is one element of a positive clutch and is rigidly secured to the shaft 29. The other element 50 of the said clutch consists of two parts arranged concentric with each other, one comprising the jaws 50' rigidly secured to the shaft 30, the other comprising the jaws 50$^a$ carried by a follower 51 free to move longitudinally of the said shaft and screw-threaded to fit the screw threaded end 30$^b$ thereof. The jaws 50' and 50$^a$ are, as heretofore stated, arranged concentric, being inner and outer portions, respectively, of sectors of the same circle. The said jaws are also formed in such way that but one of the radial edges of each jaw is in engagement with the adjacent edges of the jaw of the element 49 at a given time, there being clearance between the edges of the jaws 50′ and 50ª and the edges of the jaws of the element 49 with which they are adapted to engage for a purpose to be hereinafter described. 30ᶜ indicates keyways arranged longitudinally of the shaft 30. 52 indicates a housing for the brake. It comprises the cylinder 53 and end plates 54 and 55, respectively. The cylinder 53 has the longitudinally arranged inwardly projecting ribs 53ª extending for but a portion of the length of the cylinder adjacent to the end wall 55. 56 indicates a series of friction disks placed equally apart along the shaft 30 and having lugs extending into the keyways 30ᶜ so as to cause the disks to revolve with the said shaft. 57 indicates a series of friction disks alternately arranged with the disks of the series last described and having lugs on their peripheries adapted to engage the ribs 53ª of the cylinder 53 and prevent the rotation of the disks relative to the said cylinder. The follower 51 has a number of recesses 51ª in which are inserted springs 58 which bear against plungers 59 carried by the annular ring 60. This ring is adapted to bear against the innermost of the series of disks 57, and the springs 59 are adapted to maintain the annular ring normally in engagement with the said disk. It will be seen that when the armature shaft 29 is driven in a clockwise direction looking from the right in Fig. 2, the jaw of the clutch element 49 thereon will engage with the jaws 50′ and 50ª and will cause the rotation of the shaft 30 in a like direction and power will be transmitted through the pinion 34 in such direction as to cause the drums 23, 24 to wind up the ropes or cables thereon. Should the supply of current to the motor suddenly give out or should anything occur tending to cause the pinion 34 to suddenly reverse its direction of rotation, it will be noted that the slightest motion of rotation of the shaft 30 in an anti-clockwise direction will cause the rotation of the screw 30ᵇ on the shaft 30 within the follower 51 in such direction as to simultaneously cause the follower 51 to move longitudinally of said shaft and toward the friction plates 56 and 57, clamping the plates together and causing a great frictional resistance to be set up which will stop the rotation of the shaft 30. This longitudinal movement of the follower relative to the shaft 30 and the constant clamping together of the friction plates is possible because of the play between those edges of the clutch jaws 49, 50′ and 50ª which are not in engagement at the instant of reversal of rotation of the shaft 30, for when this reversal occurs the clutch jaws 50′ tend to turn the jaws of the clamping element 49 in an anti-clockwise direction, but the follower 51, instead of rotating anti-clockwise with the shaft 30, immediately moves longitudinally of the said shaft, clamping the friction plates thereon together and preventing the further backward rotation of the shaft.

To release the brake, rotation of the shaft 29 in an anti-clockwise direction will cause the edges of the clutch jaws of the element 49 to engage with the adjacent edges of the clutch jaws 50ª and will turn the follower 51 anti-clockwise until the edges of the jaws 50ª are in radial alinement with the edges of the jaws 50′, thereby releasing the pressure between the friction plates. The brake may also be released by rotating the shaft 29 in a clockwise direction, in which case the edges of the clutch jaws 49 will turn the clutch jaws 50′, which are in engagement therewith, in a clockwise direction until their edges are in radial alinement with the edges of the adjacent clutch jaws 50ª, in which position the pressure between the friction plates will be relieved.

The mechanical brake 46 interposed between the countershaft 35 and the gears for operating the drum shaft 20, is constructed and operates upon the same principle as the mechanical brake 31, just described, which is interposed between the armature shaft 29 and the shaft 30. The sleeve 45 is loosely mounted upon the shaft 35. This sleeve is preferably constructed as shown in the drawing, it having the relatively reduced tubular portion 45′ fitting into the bearings 38 and having rigidly secured to its inner end the gear 47. 45ª is a flange carried by the outer end of the said portion 45. From this flange extends outwardly the relatively enlarged tubular portion 45ᵇ of the sleeve, having its outer end screw-threaded as indicated at 45ᶜ. 45ᵈ indicates a collar like part rigidly secured to the extended end 35′ of the shaft 35. 46′ indicates, as an entirety, a clutch interposed between the shaft 35 and the sleeve 45. The clutch portion of this mechanical brake comprises the jaws 46ª carried by the collar 45ᵈ, the jaws 46ᵇ on the outer end of the sleeve 45, and the jaws 46ᶜ on the follower 46ᵈ which is screw-threaded and fitted to the threaded end of the said sleeve and adapted to move longitudinally thereof. 45ᶠ indicates friction plates fitted upon the sleeve 45 and caused to revolve therewith by means of the lugs fitted in keyways 45ᵍ on the said sleeve. 45ʰ indicates a series of friction plates alternately arranged with those just described and having lugs on their peripheries adapted to engage with ribs 46ᵉ carried by the casing 46ᶠ of the mechanical brake; this casing being rigidly secured in position independently of the sleeve 45. 46ᵍ is a plate interposed between the follower 46ᵈ and the outermost friction plate 45ʰ, and 46ᵉ are springs seated in sockets in the said follower and adapted to normally hold the said plate 46ᵍ in engagement with said friction plate. 46ⁱ is a cover fitting the end of the casing 46ᶠ. The jaws of the clutch 46′ are preferably of the same peculiar construction as those of the clutch 31 heretofore described. That is, the jaws of the element 46ª are so constructed that but one edge of each of said jaws is in engagement with the jaws of the sleeve 45 and the follower 45ᵈ with which it is adapted to engage at any one time, there being a little play between those edges of the clutch jaws not in engagement with each other, so that there is a slight loss of motion between the elements of the clutch when the direction of rotation of either the shaft 35 or the sleeve 45 is suddenly reversed. The operation of this mechanical brake is as follows: When it is desired to cause the drum 22 to reel up the ropes controlled by it, the clutch 43 is closed and power from the motor 28, applied through the gear 40, causes the rotation of the shaft 35. The jaws of the clutch 46' come into engagement with each other in such manner as to cause the rotation of the sleeve 45 and motion is imparted to the shaft 20 through the gears interposed between it and the said sleeve. Should there be a sudden reversal of the direction of rotation of the shaft 20 from a clockwise or winding direction to an anti-clockwise or unwinding direction of rotation, occasioned by the load on said shaft becoming greater, for any reason whatsoever, then power applied to cause its rotation in the clockwise direction or to keep it from rotating at all, the first impulse of anti-clockwise rotation imparted to the sleeve 45 causes the follower 46ᵈ to move inwardly along the said sleeve clamping the friction brake plates 45ᶠ, 45ʰ, tightly together and establishing a sufficient frictional resistance to at once stop the said anti-clockwise rotation of the sleeve and to relieve any of the rotating parts connected therewith from shock or strain due to the sudden reversal of rotation, the play between the edges of the jaws on the collar 45ᵈ and those on the sleeve 45 and follower 46ᵈ permitting of this locking of the sleeve against rotation prior to the engagement of those edges of the clutch jaws which would cause the anti-clockwise rotation of the shaft 35.

The operator's cab indicated as an entirety by G may be of any desired shape and construction. I have shown it suspended from the longitudinal bars 14', 14', of the frame 14 by means of the downwardly extending bars 60. .61 is a platform supported by the said bars. 62 is a controller for the motor 6 which propels the carriage. 63 is the controller handle for operating the same. 64 is the controller for the hoisting motor 28, it having the operating handle 65. These handles 63 and 65 and the lever 44 for operating the clutch 43 are all within ready access of the operator. 66 is a magnetic brake of any well known type arranged at the outer end of the armature shaft 29. Its function is to check the rotation of the said shaft whenever the current is cut off from the motor 28, or whenever desired.

The opening and closing movements of a clam shell bucket B during the operation of loading, lifting and dumping and then again descending to load, are well known. In the drawings the ropes or cables $b^1$, $b^2$, which are arranged to be wound upon the drum 22, are the holding or opening ropes, that is to say, the ropes which open the bucket and which also control its descent. The ropes or cables $b$, $b^3$, are those which are used for closing the bucket when receiving its load and for elevating the bucket when loaded.

The operation of a mechanism such as hereinbefore described, during the loading, hoisting, conveying and emptying of a charge of material and the return of the bucket to the loading position, is as follows:—Assuming that the bucket B with its scoops separated rests upon the material in the pile E, the operator in the cab 43, by means of the controller handle 65, causes the motor 28 to revolve, driving the power-transmitting mechanism between it and the drum shaft 20 in such direction as to cause the rotation of the drums 23, 24, thereon in clockwise direction. The scoops or carrying sections of the bucket upon this first application of power to the hoisting ropes $b$, $b^3$, are caused to dig down into the material and then to close in toward each other, scooping up a load of the material. The operator then throws the lever 44 so as to close the friction clutch 43 which causes the drum 22 also to revolve and wind up the hold or opening ropes $b^1$, $b^2$. The continued application of power to the said ropes or cables will cause the bucket to be elevated from the pile E. When at the proper distance above the pile, the operator throws the lever 44 so as to open the clutch 43 and immediately the mechanical brake 46 operates to prevent the rotation of the shaft 35 in the anti-clockwise direction and to cause the bucket with its load to be held in its elevated position. Practically simultaneously with the throwing of the lever 44 the operator throws the controller handle 65 so as to cut out current from the motor 28 and the magnetic brake at 66 operates to at once check the rotation of the armature shaft and should there be any tendency of the shaft 30 to rotate in the anti-clockwise direction after the current has been cut off from the motor, the mechanical brake at 31 will at once check it. The operator now shifts the controller handle 63, applying current to the motor 6 and causing the carriage A to advance along its supporting trackway. When the bucket B is above the point at which it is desired that it should empty its load the travel of the carriage is stopped. If it is unnecessary for the bucket to descend prior to the delivery of its charge of material, the operator shifts the controller handle 65 to reverse the motor 28, the power from which is applied to the drums 23 and 24 through the train of power-transmitting mechanism interposed between them and the said motor causing them to unwind the ropes or cables $b$, $b^3$, which control the closing of the bucket sections and permitting the bucket sections to swing open and deliver the load of material.

If it is necessary for the bucket to descend with its load for a distance prior to its delivery of the same after it has been stationed above the point at which it is desired that it should deliver its load, the lever 44 is thrown so as to close the clutch 43 and the controller handle 65 is shifted so as to cause a slight anti-clockwise rotation of the armature shaft 29; this will cause the edges of the clutch element 49 thereon to engage with the coöperating element of the clutch jaws on the follower 51 in such manner as to cause the said follower to be rotated in anti-clockwise direction and to move it longitudinally of the shaft 30 and away from the series of friction plates 56 and 57 so as to relieve the frictional resistance between them. Power will now be applied through the pinion 34 and gear 40 in such a way as to cause the shaft 35 to revolve in an anti-clockwise direction, bringing the edges of the jaws on the clutch element $46^a$ into engagement with the coöperating edges on the follower $46^d$ in such manner as to cause the follower to move longitudinally of the sleeve 45 and to release the high frictional resistance between the friction disks controlled by it. The bucket B may now be permitted to descend under the control of the mechanical brake at 46. When at the desired elevation, the operator opens the clutch 43 causing the mechanical brake 46 to set and hold the drum 22 against anti-clockwise rotation, and the tension having been relieved from the ropes or cables $b$, $b^3$, the drums 23, 24, are free to revolve in anti-clockwise direction, and consequently the frame of the bucket descends, and the scoops or bucket sections swing outwardly and deliver the charge of material therefrom. The operator then closes the clutch 43 by means of the handle 44 and throws the controller handle 65 so as to cause the armature shaft 29 of the motor 28 to revolve in the clockwise direction and power is at once transmitted to the drum shaft 20 causing the winding up of the cables $b^1$, $b^2$, and the elevating of the bucket B while it is open. When at the desired height above the pile of material E, the operator again opens the clutch 43, relying upon the mechanical brake 46 to lock the drum 22 against anti-clockwise rotation and then switches current to the motor 6 for driving the carriage. When he reaches the point where the bucket is above the point at which he desires to load, he stops the travel of the carriage, throws in the clutch 43, applies power through the motor for rotating the shaft 35 in an anti-clockwise direction so as to release the mechanical brake at 46 and then permits the bucket to descend under the control of the said brake 46.

While above I have illustrated and described a mechanism embodying my invention, it will be understood that the scope of my invention is not limited to the details of construction described and shown, but that numerous uses and applications of my ideas will present themselves which will come within the spirit of my invention.

Claims.

1. In a hoisting apparatus, the combination with a drum and a motor, of a train of power transmitting devices interposed between the motor and the drum and having in said train a device adapted both to transmit motion and to automatically act to prevent the sudden reversal of rotation of said drum from a winding to an unwinding direction and a clutch interposed between said motor and said device.

2. In a hoisting apparatus, the combination with a hoist drum and a motor, of a train of power transmitting devices interposed between the drum and the motor and having in said train a positive clutch for controlling the winding of said drum, a friction brake adapted to automatically operate to prevent the sudden unwinding thereof and a clutch between said friction brake and said motor.

3. In a hoisting apparatus, the combination with the hoist drum and a motor, of the train of power transmitting devices interposed between the motor and the drum and having in said train an automatically actuated friction brake adapted to prevent the sudden unwinding of the drum and a friction clutch between said friction brake and said motor.

4. In a hoisting apparatus, the combination with a hoisting drum and a motor for operating it, of a train of power transmitting devices interposed between the motor and the drum and having in said train a positive clutch adapted to control the winding of said drum, a brake automatically controlled by the elements of said clutch for preventing the sudden unwinding thereof and a clutch between said positive clutch and said motor.

5. In a hoisting apparatus, the combination with a hoist drum and a motor for operating it, of a train of power transmitting devices interposed between the motor and the drum and having in said train of devices means for positively controlling the rotation of said drum in a winding direction, means controlled by said first described means adapted to prevent the sudden rotation of the drum in the opposite direction and a clutch interposed between said first described means and said motor.

6. In a hoisting apparatus, the combination with a hoist drum, a motor and a motor shaft, of a train of power transmitting devices interposed between the motor shaft and the drum and having in said train a positive clutch, a friction brake associated with one element of said clutch and adapted to prevent the sudden reversal of rotation of said motor shaft and a second clutch interposed between said brake and said hoist drum.

7. In a hoisting apparatus, the combination with a drum shaft, a drum loosely mounted thereon, and a motor, of a train of power transmitting devices interposed between said motor and said drum and having in said train a positive clutch for controlling the winding movements of the drum an automatically operated brake adapted to prevent the sudden reversal of rotation of the drum and a clutch interposed between said positive clutch and said motor.

8. In a hoisting apparatus, the combination with a drum shaft, a drum loosely mounted thereon, and a motor, of a train of power transmitting devices interposed between said motor and said shaft and having in said train a positive clutch for controlling the winding of said drum a brake automatically operated by the elements of said clutch adapted to prevent the sudden unwinding thereof and a clutch interposed between said positive clutch and said motor.

9. In a hoisting apparatus, the combination of the hoist drum, the motor, the power transmitting devices interposed between the motor and the drum, the brake adapted to prevent the sudden unwinding of the drum the brake adapted to prevent the sudden reversal of rotation of said motor shaft, and the clutch interposed between said brakes.

10. In a hoisting apparatus, the combination with a drum shaft, a drum rigidly secured thereto, a motor and a motor shaft, of a train of power transmitting devices interposed between said shafts and having in said train a friction clutch, a positive clutch, and a brake adapted to prevent the sudden reversal of one element of said positive clutch and to avoid sudden reversal of rotation of said motor shaft.

11. In a hoisting apparatus, the combination of a drum shaft, a drum rigidly secured thereto, a motor, a motor shaft, a counter shaft arranged between the motor shaft and the drum shaft, a friction clutch interposed between the motor shaft and the counter shaft, a positive clutch interposed between the counter shaft and the drum shaft and a brake interposed between the last said shafts and adapted to control the rotation of one element of said positive clutch in one direction to prevent strains upon said counter shaft due to the sudden unwinding of the drum.

12. In a hoisting apparatus, the combination of the drum shaft, the drum thereon, the motor, the motor shaft, the counter shaft arranged between the drum shaft and the motor shaft, the positive clutch interposed between the motor shaft and the counter shaft, the brake interposed between the said shafts and adapted to control one element thereof against sudden reversal of direction of rotation the friction clutch interposed between said motor shaft and said counter shaft, the positive clutch interposed between said counter shaft and said drum shaft and the brake adapted to control one element of said last described clutch to prevent the sudden reversal of rotation of said counter shaft.

13. In a hoisting apparatus, the combination of the motor, the motor shaft, the shaft arranged in alinement with said motor shaft, the positive clutch interposed between the said shafts, the brake associated with one element of said clutch and adapted to control it so as to prevent the sudden reversal of the direction of rotation of said motor shaft from a winding to an unwinding direction, the hoisting drum and power transmitting mechanism interposed between said alined shafts and the drum.

14. In a hoisting apparatus, the combination of the motor, the motor shaft, the shaft arranged in alinement with the motor shaft, the positive clutch interposed between the said shafts, the brake associated with one element of said clutch and adapted to be operated thereby, the counter shaft, the train of power transmitting devices between said counter shaft and said last described shaft having in said train a friction clutch, a drum shaft, and the train of power transmitting devices interposed between said shafts and said drum shaft.

15. In a hoisting apparatus, the combination of the motor, the motor shaft, the shaft arranged in alinement therewith, the positive clutch interposed between the said shafts, the brake associated with one element of said clutch and adapted to be operated thereby, the counter shaft, the train of power transmitting devices interposed between said counter shaft and said drum and having in said train a positive clutch, and a brake associated with one element of said clutch and adapted to be operated thereby.

16. In a hoisting apparatus, the combination of the motor, the motor shaft, the shaft 30 arranged in alinement therewith, the positive clutch interposed between the said shafts, the brake for the shaft 30 adapted to be operated by one element of said positive clutch, the counter shaft, the sleeve thereon, the train of power transmitting devices between said shaft 30 and said sleeve, the drum shaft, the drums loosely mounted thereon, the power transmitting devices between said sleeve and said drums, the drum rigidly secured to said shaft, the friction clutch interposed between said sleeve and said counter shaft, the power transmitting devices interposed between said counter shaft and said drum, and the brake adapted to prevent the sudden reversal of rotation of the said counter shaft.

17. In a hoisting apparatus, the combination with a hoisting drum, a motor, and a motor shaft, of a train of power transmitting devices interposed between said motor shaft and said drum and having in said train a shaft arranged in alinement with said motor shaft and a positive clutch interposed between said shafts, and a friction brake associated with said alined shaft and adapted to be operated thereby to prevent the sudden rotation thereof in the direction for unwinding the drum.

18. In a hoisting apparatus, the combination with a hoist drum, a motor, a motor shaft, and a train of power transmitting devices interposed between said shaft and said drum, of a brake adapted to prevent the sudden reversal of rotation of the motor shaft and a second brake adapted to prevent the sudden rotation of said drum in unwinding direction.

19. In a hoisting apparatus, the combination of the hoist drum, the motor, the motor shaft, the shaft 30 arranged in alinement with said motor shaft, the train of power transmitting devices interposed between said shaft 30 and the drum, the positive clutch interposed between said shaft and the motor shaft and being constructed to have lost motion between the elements thereof so that either of said shafts may be rotated slightly without rotating the other, the friction brake associated with the shaft 30 and means operated by said shaft when it is rotated in one direction for setting said brake to prevent the further rotation of said shaft in that direction.

20. In a hoisting apparatus, the combination of the hoist drum, the motor shaft, the shaft 30 arranged in alinement therewith, the train of power transmitting devices interposed between said shaft 30 and the drum, the positive clutch interposed between said shaft and the motor shaft, it being constructed to have lost motion between its elements so that either shaft may be oscillated slightly without oscillating the other, the friction disks arranged to rotate with said shaft 30, the friction disks arranged to engage the last described disks and held stationary relative thereto, and the follower 50 threaded to the shaft 30 and adapted to move longitudinally thereof to clamp said friction disks together when the shaft 30 is rotated in one direction.

21. In a hoisting apparatus, the combination with a drum and a motor, of a train of power transmitting devices interposed between these two and including automatically actuated means for preventing the sudden reversal of rotation of said drum from a winding to an unwinding direction, and a clutch interposed between the said automatically actuating means and the drum, substantially as set forth.

22. In a hoisting apparatus, the combination of a drum on which is wound the hoisting rope, another drum on which is wound a rope for controlling the discharge of the load, a motor, a train of devices through which power is transmitted from the motor to the first said drum, a train of devices through which power is transmitted to the second of said drums, each train of devices including automatically operating means for preventing a sudden unwinding of the drum with which it respectively connects, substantially as set forth.

23. In a hoisting and conveying apparatus, the combination of a vessel for holding and conveying material, a rope for controlling the discharge of said vessel, a drum upon which the rope is wound, and means for driving the drum to wind the rope thereupon or unwind it therefrom as the vessel is elevated or lowered, the said means including an automatically operating device for preventing the sudden unwinding of the drum, substantially as set forth.

24. In a hoisting apparatus, the combination with a drum and a motor, of a train of power transmitting devices interposed between the two, comprising a pair of shafts, a positive clutch uniting the shafts, the clutch being arranged to permit limited axial movement of one member relative to the other, a nut-like follower engaging with a screw thread on one of the shafts, and having a clutch part adapted to engage with the clutch of the other shaft, and a friction brake operated by the said follower for stopping the said train of gearing, substantially as set forth.

25. In a hoisting apparatus, the combination of a drum shaft, a pair of drums thereon, one loose and the other secured fast thereto, a shaft 35 parallel with the drum shaft, gearing between the said two shafts including automatically operating means for checking a sudden reversal of the drum shaft, a sleeve surrounding the shaft 35, gearing between the sleeve and the loose drum, driving gearing for the sleeve including means for checking a sudden reversal of the loose drum, and a clutch interposed between the said driving means and the shaft 35, substantially as set forth.

26. In a hoisting apparatus, the combination of a drum shaft, a pair of drums thereon, one loose and the other secured fast thereto, driving gearing for the loose drum including means for checking a sudden reversal of said drum, gearing through which power is transmitted to the drum shaft, including means for checking the sudden reversal of the drum shaft, and means for connecting together the driving gearing of the two drums whereby they are caused to turn together, substantially as set forth.

In testimony whereof I affix my signature in presence of two witnesses.

JOHN C. SLOCUM.

Witnesses:
S. M. COLWELL,
E. R. MERRILL.